Oct. 27, 1970    W. HERBST ETAL    3,536,887
METHOD AND APPARATUS FOR WELDING GRIDS
Filed Nov. 30, 1967    3 Sheets-Sheet 1
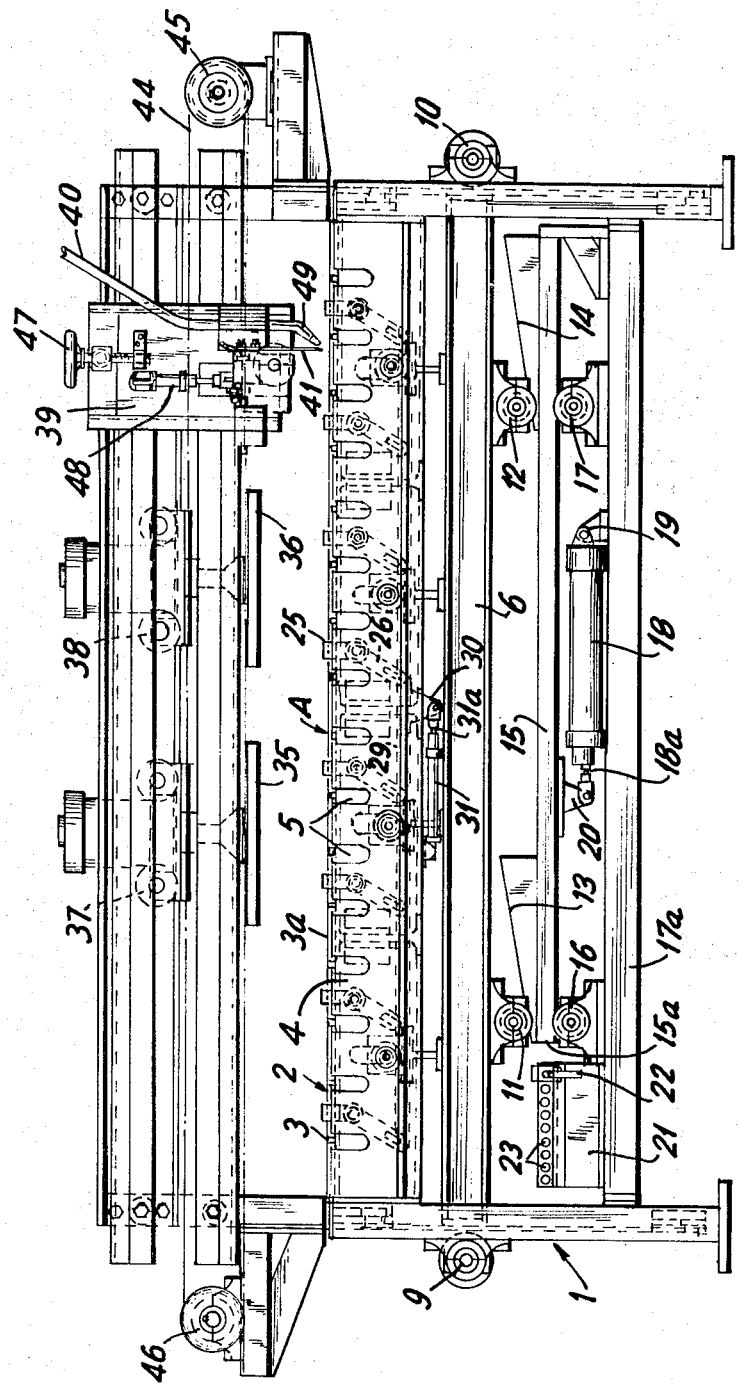
FIG. I
INVENTORS
WILHELM HERBST
HANS MARTIN
BY
*McGlew & Toren*
ATTORNEYS

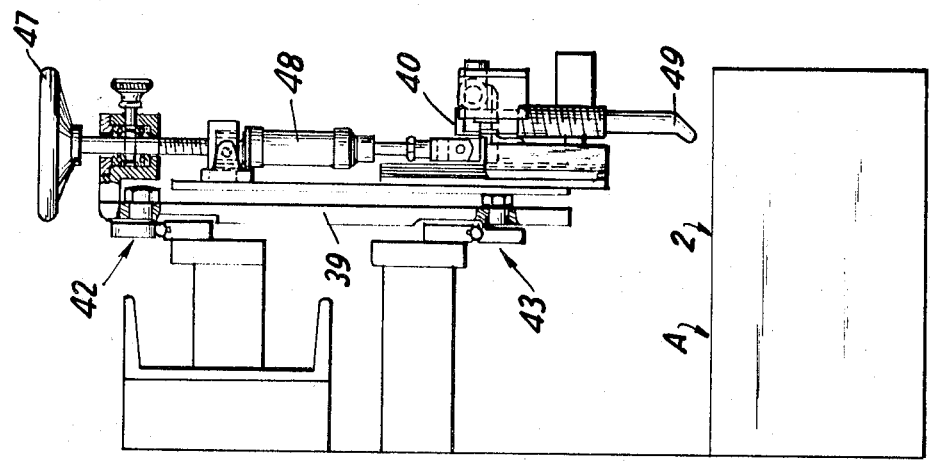
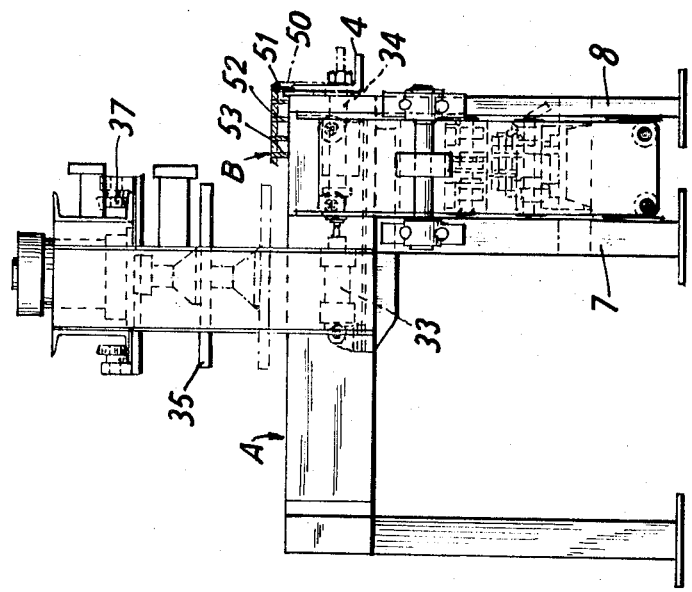

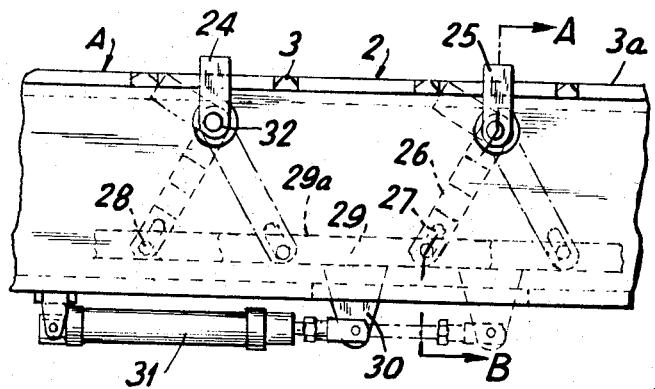
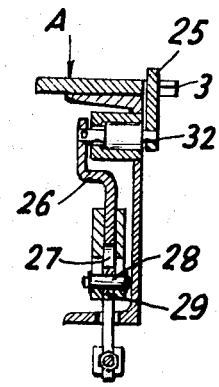
FIG. 4          FIG. 5
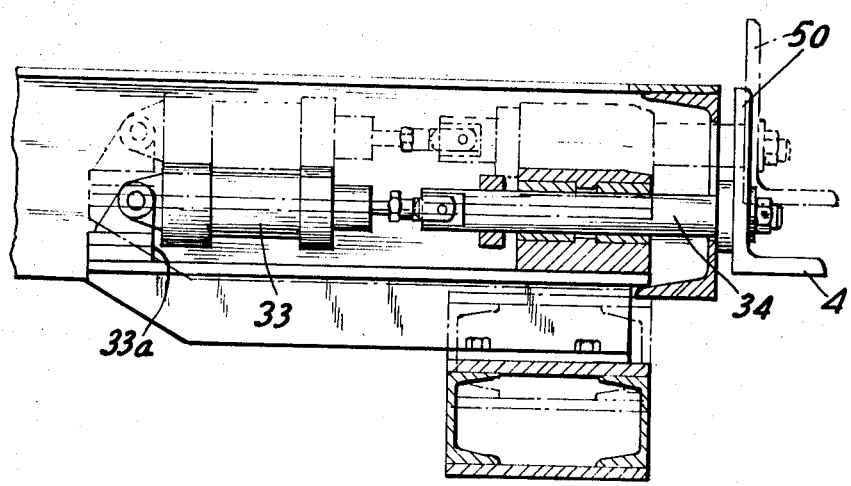
FIG. 6

United States Patent Office 3,536,887
Patented Oct. 27, 1970

3,536,887
METHOD AND APPARATUS FOR WELDING GRIDS
Wilhelm Herbst and Hans Martin, Stadtlohn, Westphalia, Germany, assignors to Lichtgitter Gesellschaft m.b.H., Stadtlohn, Westphalia, Germany
Filed Nov. 30, 1967, Ser. No. 687,028
Claims priority, application Germany, Dec. 3, 1966, L 55,194
Int. Cl. B23k 9/12
U.S. Cl. 219—125                                7 Claims

ABSTRACT OF THE DISCLOSURE

A device for welding side framing members along the sides of a grid formed of main members and cross members, is made up of a work table, a guide edge member disposed along one side of the work table, means for securing the grid to the work table, and welding means. The work table has a planar working surface on which a grid is secured in position, the guide edge aligns one side of the grid and after the grid is properly aligned the guide edge is removed, a side framing member is positioned along the grid edge, and then the guide edge is replaced for holding the framing member in position during welding. The welding device is positioned above the grid and is movable in the direction of the guide edge along a line formed by the joints between the framing member and the adjoining grid members for selectively welding one to the other. The welding device includes a feeler member for properly positioning the welding device at the corners of the framing member and the grid members to be welded together. Further, the welding head of the device is disposed at a 45° angle relative to the guide edge and to the working surface of the work table whereby it is properly positionable for the welding operation. The means for securing the grid on the working surface of the work table are movably positionable for holding grids of various sizes. In addition, the guide edge is positionable in both a vertical and a horizontal direction for properly aligning the grid and then positioning and securing framing members along the edge of the grid.

In the method of welding exterior framing members to a grid the following steps are performed: the grid is secured on the working surface of the work table and is held in place against a lateral support, the lateral support is removed while the grid is held in position and a framing member is positioned along the side of the grid, the lateral support is repositioned along the side holding the framing member in place, and the side framing member is welded to either the adjoining main members or cross members of the grid. During the welding operation a feeler member is employed for moving the welding device between adjacent welding joints along the edge of the grid.

SUMMARY OF THE INVENTION

The present invention is directed to a method of and apparatus for welding side framing members along the edge of a grid formed of main members and cross members and, more particularly, to an arrangement wherein the grid is held securely in place and properly aligned for receiving the side framing member, and the side framing member is secured to the grid by an automatic welding operation.

Generally manual welding processes have been used for joining the side framing members of a grid to its main and cross members. In such methods, alternatively all of the grid bars are welded to the framing bars at the upper side of grid or the main and cross members of the grid are welded together with the framing members. In the latter case additional welding is usually required at the bottom surface of the grid to obtain the required rigidity for the grid.

In addition to the above mentioned processes, it is also known to weld grids together by employing butt welding or spot welding methods.

These various prior art methods have the disadvantage that after securing the framing member to the grid further steps are required such as grinding, trimming, slag removing and the like or considerable losses of material are caused by the use of shaped framing members or bars. Another disadvantage exists in the inability to automatically position the framing members along the edge of the grid or, if it is possible to be done automatically, it can be accomplished only with considerable difficulty.

Disadvantages similar to those experienced in known welding method also have been experienced in mechanical methods of securing the framing members to the members forming the grid. In such mechanical methods generally flat and perforated framing members are attached to shaped main and cross members forming the grid or, alternatively, cold rolled or warm rolled shaped framing members are fastened or pressed onto the ends of the grid members.

Accordingly, it is a primary object of the invention to provide both a method of and an apparatus for automatically welding framing members to the main and cross members of a grid.

Another object of the invention is to properly position and align the interior members of the grid for the step of securing the framing member.

Another object of the invention is to provide an apparatus wherein the grid members are secured and held firmly in position on a planar working surface and the various means for securing the grid members in position are movably positionable to accommodate grids of various sizes.

Yet another object of the invention is to provide a construction of the working surface on which the grid is welded which prevents the collection thereon of welding materials.

Still, another object of the invention is to afford an automatically movable welding device for stepwise positioning the welding head at the corners of the individual grid members and framing member to be welded.

Moreover, another object of the invention is to provide a simplified apparatus for automatically welding framing members to a grid, which is easily operable and which may accommodate various sizes and thicknesses of grids.

In carrying out the present invention initially the grid, formed of main members, and cross members, is positioned on the working surface of a work table without the side framing members. Press members secure the grid to position, while a movable guide edge properly aligns one side of the grid for receipt of the framing member. After the guide edge is removed the framing member is placed in position and the guide edge is again applied this time holding the framing member securely and accurately in place against the grid. The construction of the apparatus affords an open area for welding the framing member to the grid members. In the final step of the operation a welding head is moved along a line parallel with the framing member in stepwise manner employing a feeling device for properly positioning the welding head at each of the corners to be welded. The welding operation is carried out in the presence of a protective shielding gas.

The guide edge for properly aligning the grid and then for holding the framing member in place is movably positionable in both a horizontal and vertical direction for assembling the grid and for selectively accommodating the various sizes of grids and framing members. During the welding operation the guide edge properly aligns the framing member against the grid so that distortion and misalignment are avoided.

In the present invention all of the steps for welding the framing member to the side of a grid are formed in a single machine. In the first step a pressure welded grid formed of main members and cross members is arranged on the working surface of a work table and is secured in position laterally by placement against a movable positionable guide edge on the machine. Press members are secured downwardly against the grid holding it securely in a planar position on the working surface. By displacing the guide edge outwardly from the grid the framing member to be welded to the grid can be properly positioned along the side of the grid and the guide edge repositioned for holding the framing member in position and alignment. Now the grid and the framing member are securely positioned in a planar orientation and the welding can be performed by automatically positioning a welding head movably along a line parallel with framing member at each intersection of the framing member and the grid bars. Because of the arrangement of the guide edge, that is because of its ability to be displaced both horizontally and vertically relative to the working surface supporting the grid, it can perform the steps of first properly aligning the grid and holding it in position in combination with the press members, then it can be removed while framing bar is inserted into position and replaced for holding the framing member securely in place during the welding operation. The combination of the working surface, the press members, and the guide edge assure that the cross members and main members of the grid as well as the frame member are always located in the same vertical plane in proper position for the welding step. The use of a protective shielding gas in the welding operation eliminates the necessity of any further processing of the welded joint after the welding operation is completed.

By employing the press members as clamps for securing the grid in position during the welding operation it is possible to keep the grid and the framing member secured in a planar disposition which does not show any buckling effect after galvanizing the grid is accomplished. This fact constitutes a considerable technical advance over the art.

The device for carrying out the invention is constructed basically of a machine frame comprising a work or welding table having a working surface and a guide edge which is vertically and horizontally movable relative to an edge of the working surface. Positioned above the working table are movably positionable press members for securing the grid in place and a movably positionable welding device for securing the framing member to the sides of the grid. In the area of the welding operation the working surface of the table is provided with support strips spaced apart to afford intermediate open spaces. The upper faces of the strips have downwardly sloping surfaces so that slag and the like which is deposited on these surfaces during the welding process will drop into a receiving area and will not foul the working surface or the grid.

Though the support strips are situated at the location of the guide edge there is no interference between the two because slotted openings are formed in the guide edge permitting it to be movably positionable about the strips.

Movable separator cams are disposed in the open spaces between the support strips along the edge of the grid contacting the guide edge. The front surfaces of the separator cams, that is the surface facing the guide edge, are located flush with the front edge of the main members or cross members disposed adjacent the guide edge. The separator cams are constructed as elbow levers and are rotatable about a fixed fulcum for displacement between an operative and an inoperative position. The separator cams are attached to means for properly disposing the cam between the operative and inoperative position. During the attachment of the framing member to the grid the guide edge is forced inwardly against the frame member securing it to the grid. At the same time the separator cam is moved into its operative position along the inner surface of the frame member securing it against inward energy source is employed to heat the working fluid of a the grid and the framing member.

A support assembly is disposed below the guide edge and comprises a hydraulic piston which selectively moves a support member carrying obliquely surfaces which ride on rollers for lifting and lowering the guide edge. Additionally, a stop member is located at one end of the member carrying the obliquely disposed surfaces for selectively determining the height to which the guide edge is positioned. Preferably two obliquely disposed surfaces are employed for properly lifting and lowering the guide edge. The use of obliquely disposed surfaces has proved to be particularly advantageous since it guarantees the placement of the guide edge in a planar orientation relative to the working surface of the table.

The welding device is formed of a welding head and a feeler member which are mounted on a movably positionable support. The feeler member has a conically converging end which passes over the grid and contacts the members of the grid to be attached to the framing member. In combination with the feeler member is an automatic control which performs the following steps during the welding operation:

(a) as the adjacent cross or main members of the grid are contacted by the feeler pin the movement of the support for the welding device is discontinued and the welding head operating under a shielding gas is actuated;

(b) the welding operation is performed in a predetermined time period at the end of which the welding operation is discontinued;

(c) the feeler pin is elevated; and (d) in the final operation of the cycle the support is released for movement and the feeler pin is again lowered into its effective position for determining the location of the next welding joint.

In the apparatus for moving the welding device the means for stopping the support is effected in a two step operation first by a brake on the motor driving the support and then through a shutting off of the motor. It is thus guaranteed that, in spite of rapid movement of the support, the automatic welding device is always located exactly at the proper position for welding the main or cross members of the grid to the framing member.

Another advantageous feature of the invention is the placement of the welding head at a 45° angle relative to the working surface of the work table and also to the longitudinal axis of the main or cross members whichever are being welded to the framing member so that the welding head is always directed exactly at the corner between the framing member and the cross or main member to which it is to be secured.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 1 is a front elevation view of an apparatus embodying the present invention;

FIG. 2 is a side view of the apparatus shown in FIG. 1;

FIG. 3 is an enlarged view of a portion of the apparatus shown in FIG. 1;

FIG. 4 is an enlarged partial detail view of a part of the apparatus shown in FIG. 1;

FIG. 5 is a sectional view taken along line A–B in FIG. 4; and

FIG. 6 is an enlarged partial detail view of a section of the apparatus shown in FIG. 2.

DETAILED DESCRIPTION OF THE INVENTION

In FIG. 1 a frame construction 1 is shown forming a work or welding table 2 taving a working surface A. In FIG. 1 the front side of the welding table 2, that is the side facing the operator, is shown. Along the front side of the working surface A, at which the welding operation is to be performed, a plurality of spaced supporting strips 3 are disposed with open spaces 3a located between the strips. The arrangement of the strips 3 and the open spaces 3a can be more clearly seen in FIG. 4 which provides a detail of this portion of the welding table 2. The upper surfaces of the strips, that is the portion facing in the upward direction from the working surface, slope downwardly on either side from a ridge-like midpoint giving the surface a peaked appearance. These sloping surfaces of the supporting strips 3 shed any waste material such as slag and the like, dropping downwardly onto them during the welding process, thereby avoiding any fouling of the working surface or of the grid being welded.

A guide edge 4 is positioned along the front edge of the welding table, as is shown in FIGS. 1, 2 and as is illustrated in the detail in FIG. 6, and its upper edge is situated in the vicinity of the support strips 2. At the location of each of the support strips 3 across the front edge of the welding table 2 the guide edge 4 is provided with vertically elongated slots 5. These slots 5 permit the guide edge 4 to be moved vertically and horizontally without any interference with the strips. The guide edge 4 is L-shaped in cross section with its outstanding leg located at its lower end and extending outwardly from the work table 2. The guide edge 4 is disposed on a support member 6 which in turn is guided at its ends on the vertical members 7 and 8, see FIG. 2, by means of roller guides 9 and 10.

For the vertical positioning of the guide edge the support member 6 has a pair of horizontally spaced roller elements 11, 12 extending downwardly from its lower surface. These roller elements 11 and 12 are positioned on bearing surface members 13 and 14 obliquely disposed to the longitudinal axis of the support member 6 and are mounted on the upper surface of a movably positionable rod 15. The rod 15, in turn, is supported by a pair of horizontally spaced stationary roller elements 16 and 17 located on a horizontal support member 17a which is secured to the frame of the table 2. A hydraulic cylinder 18 is disposed below the rod 15 and is secured to the horizontal member 17a. At its left end, as shown in FIG. 1, the cylinder has a movably positionable arm 18a which is secured to a bearing support 20 attached to the rod 15. The rod is arranged to be moved in the left hand direction as shown in FIG. 1, and opposite its end 15a there is an adjustable limiting stop member 21 provided with a movable element 22 positionable in a plurality of supports 23 for individually adjusting the position of the stop. Relative to the rod 15 as the stop element 22 is moved from right to left in the supports 23 the distance the rod 15 can be moved is increased and the rollers 11 and 12 will ride upwardly on the obliquely disposed surfaces 13 and 14 for vertically positioning the support member 6 and in turn the guide edge 4.

Along the front edge of the welding table 2 as shown in FIG. 1, a separator cam 24 is provided in each of the open spaces 3a between the support strips 3. The separator cams 24 are formed of a two part lever construction comprised of an upper element 25 and a lower element 26. At its lower end the lower element 26 has an oblong slot 27 in which a pin 28 is engaged which secures the lower element 26 to a slide member 29 mounted in a slot arrangement 29a in the carrying frame 1. Disposed below the separator cams is a hydraulic cylinder 31 having a connecting bracket 30 secured to the outer end of its movable arm 31a, the bracket 30 is also secured to the slide 29 and by movement of the arm 31a the slide can be moved back and forth through the slot 29a. The lower end of the upper element 25 and the upper end of the lower element 26 are pivotally attached to a fixed fulcrum 32 so that the separator cam 24 can be moved between an operative position with the upper element 25 extending upwardly above the working surface A of the work table 2 and an inoperative position shown in the dot-dash line in FIG. 4 wherein the upper element is rotated downwardly to a position below the working surface.

In FIG. 5 a sectional detail is shown of the separator cam with the upper element 25 in the operative position extending above the working surface A and spaced between adjacent support strips 3. The upper and lower lever elements are pivotally supported on the fixed fulcrum 32 and the lower element 26 has a fork-like arrangement in its lower end for fitting on the slide 29 to which the lower element 26 is connected by means of the pin 28 disposed in the slotted hole 27. While the cylinder 31 is stationary relative to the slide 29, i.e. it is supported by the frame 6 which carries the edge support and, accordingly, it is movable with this frame when the guide edge is moved in the vertical direction. Since the separator cams can be moved between an operative position and an inoperative position they have the advantage of avoiding the accumulation of any materials which might be deposited during the welding operation, since during the movement of the cam 24 between its two positions in the space 3a, any adherent material deposited during welding will be removed and displaced downwardly.

The guide edge 4 is movable in a horizontal direction by means of a hydraulic cylinder 33 mounted within the carrying frame, see FIGS. 2 and 6. The cylinders 33 are fixed to the frame by means of supports 33a and have movably positionable arms 34 secured to the guide edge 4 for moving in the horizontal direction. In FIG. 6 the cylinder 33 shown in solid lines indicates the lowered retracted position of the guide edge 4 while the dotted lines show both the vertical and horizontally displaced positions of the guide edge, located outwardly from the front edge of the working surface A.

Mounted on the carrying frame 1 above working surface A of the welding table 2 are a pair of spaced vertically positionable press members 35, 36 which are dependently supported by roller elements 37, 38 for positioning the member in the horizontal direction. Though the means for doing so are not shown in the drawings, it will be appreciated that the press members may be moved horizontally along the frame for adapting to the various size of grids.

A holder member 39 is also positioned above the working surface A for supporting the welding device 40 and a feeler device 41. As shown in FIG. 3 the holder member 39 is horizontally positionable along guide rails 42, 43 mounted on the carrying frame, and movement between welding positions is effected by means of a drive mechanism 44 extending over guide pulleys 45, 46 at opposite ends of the welding table, with one of the pulleys being driven for affording the movement of the support across the working surface A.

The overall arrangement of the welding device 40 and the feeler device 41 may be adjusted in height relative to the working surface A by means of a manual control 47, with a hydraulic cylinder 48 affording the required lifting movement for the feeler device over a cross or main member of the grid.

In FIG. 2 a partial section of a grid B is shown formed of main members 53 and cross members 52, with the main members running parallel with the front edge of the work table 2 and the cross members disposed at right angles to the front edge so that they abut the framing member secured in place by means of the guide edge 4 and the separator cam 24.

With reference to FIGS. 1 and 3, the welding tip or head 49 of the welding device 40 is disposed at a 45° angle to the working surface A of the work table 2 as well as being disposed at a 45° angle to the longitudinal axis of either of the main members or cross members of the grid whichever is disposed at right angles to the front edge of the machine. Due to its angular disposition, the welding head 49 can be directed exactly into the corner of the grid member and the framing member which are to be welded together.

In the operation of the apparatus described above, the guide edge 4, when not in use, is located in a lower position as illustrated by solid lines in FIGS. 1, 2, and 6. At the commencement of operation a grid B is placed on the working surface A of the work table 2 and the guide edge 4 is moved upwardly by means of a manually operated control, not shown, until its upper edge is in the same plane as the upper surface of the grid B. In order to raise the guide member 4 the hydraulic cylinder 18 is actuated moving the rod 15 toward the stop 21 with the position of the stop element 22 limiting the travel of the rod 15 and determining the height to which the guide member is to be lifted. As the rod 15 rolls on the roller elements 16 and 17 the obliquely disposed surfaces 13 and 14 located on its upper edge move to the left in contact with the roller elements 11 and 12 which are secured to the lower part of the support member 6. The obliquely disposed surfaces 13 and 14 force the support member 6 upwardly, and the member 6 rides on the frame of the work table by means of the rollers 9 and 10. When the guide edge 4 has been lifted to the proper plane, it is moved inwardly to its proper position relative to the grid B. Next the grid formed of the cross members 52 and the main members 53, is manually secured and aligned against the guide edge. Then the press members 35 and 36 are lowered into contact with the grid holding it securely in place on the working surface A and assuring that the entire grid is disposed in co-planar relationship with the working surface A.

With the grid held in place on the working surface and properly aligned with the guide edge 4 the cylinders 33 within the carrying frame move the guide edge outwardly a sufficient distance for placing the framing member 51 (note FIG. 2) into the open space between the grid B and the guide edge 4 in its outwardly disposed position. When the cylinders 33 move the guide edge outwardly, a simultaneous operation is performed on the separator cams 24 and they are moved from the inoperative position to the operative position with the upper element 25 extending upwardly above the working surface A and in position to contact the inner lower surface of the framing member 51 when it is located along the edge of the grid B. As displayed in FIG. 2 the framing member 51 abuts the adjacent carrying members 52 along its upper inner edge and at its lower inner edge it is in contact with the upper edge of the separator cams 24. With the frame member now properly positioned against the grid the cylinders 33 retract the guide edge 4 and it moves inwardly into contact with the outer surface of the framing member securing it against the grid so that it is properly positioned and aligned by the guide edge and by the separator cam.

As a result of the steps described above at this point the following results have been achieved:

(a) grid B is secured on the working surface A of the welding table 2 in an absolutely planar parallel position;

(b) the framing member 51 is secured in alignment along the edge of the grid at the front edge of the welding table and is in bearing engagement with the cross members 52 as shown in FIG. 2, or with the main members 53 if the orientation of the grid were to be changed by 90°, in addition the frame member is properly positioned in alignment vertically as well as horizontally with the grid member to which it is to be attached; and (c) the inner surface of the frame member 51 regardless of its thickness, is disposed in a line along the outer edges of the grid bars to which is to be attached and it is properly aligned in the vertical direction by means of the guide edge 4 on one side and the separator cam and the grid member 52 or 53 on the other side.

With the grid B and its framing member 51 in proper alignment for the welding operation the support 39 is moved in the arrangement shown in FIG. 1 to the left until the feeler device 41 is brought into contact with the first cross member 52. It will be appreciated that the grid could be turned 90° to another side whereby the main members would contact the frame member and in such an instance the feeler member would then contact the main member as it is moved into the operating position. As the feeler device 41 comes into contact with the cross member 52 it actuates a brake on the motor, not shown, and subsequently shuts the motor off, so that the welding head 49 is stopped immediately before the point of contact between the cross member and the framing member. With the support 39 in its stopped position the welding process is initiated, the duration of the process having previously been determined in dependence on the thickness of the materials used and other factors. During the welding operation a protective shield gas is afforded at the point of welding so that subsequent treatment of the welded joint is unnecessary. After the welding operation has been automatically completed the feeler device 41 is lifted over the cross member 52 by means of the cylinder 48 and it continues in movement with the support 39 until it comes in contact with the next cross member. At this point the movement of the support is again discontinued and another welding operation is commenced. This operation continues along the points of contact between the cross members and the framing member. It will be obvious that the duration of the operation is dependent upon the welding time for each welded joint times the number of welds across the grid.

When the framing member has been welded for its entire length to the adjoining cross members 52 and the feeler device 41 no longer comes in contact with any cross members then the direction of travel of the support 39 is reversed and it returns to its starting position, that is to the right hand end of the welding table as shown in FIG. 1. At the same time by automatic means, not shown, the clamping of the grid B and the framing member is released by moving the guide edge 4 away from the grid and the press members 35, 36 upwardly from the working surface A. As a part of this operation the guide edge is moved not only outwardly but downwardly to its starting position as shown in solid lines in the drawings. Further, simultaneously the separator cams 24 are moved from the operative to the inoperative position and the grid member with the framing member now secured to it may be removed from the table or it may be repositioned on the table so that additional framing members may be secured to other of its sides. Since these various operations are automatically accomplished at the end of the welding operation it is not necessary for the operator to pay continuous attention to the machine.

With the automatic performance of the welding steps a uniform welding of the framing members to the grid is achieved and with the use of the protective shielding gas any subsequent treatment of the welding joints becomes unnecessary.

Control of the individual steps described above may be effected manually or automatically by means of appropriate terminal switches and time switches, not shown.

Since the welding operation is performed automatically it is possible for one operator to handle two different machines wherein several types of construction of the welding machine are possible. In this manner two such machines as illustrated and described may be arranged facing each other with the operator positioned between them so that the machines may be alternatively fed by the operator. This arrangement is particularly suitable for constructing grids which have continuously varying dimensions in respect to length and width. Another alternative arrangement which is possible would be to employ the welding machine at two adjacent operating locations with the locations being fed alternately. This type of arrangement is particularly suited to the processing of large quantities of grids of the same size.

Still another possible arrangement where non-supporting obliquely disposed framing members have to be applied to the grid employs two welding machines worked in such a manner without reversing whereby the welding to the grid is achieved in a single pass procedure first through one welding operation and then through the other.

It will be readily appreciated that the arrangement illustrated and described, while setting forth the basic concept of the invention, is not intended to limit the inventive concept and changes may be made in the arrangement depending on the particular form of the grid employed and other factors, without departing from the invention.

While a specific embodiment of the invention has been shown and described in detail to illustrate the application of the inventive principles, it will be understood that the invention may be embodied otherwise without departing from such principles.

What is claimed is:

1. A device for welding side framing members along the sides of a grid formed of main grid members and cross grid members comprising a frame construction forming a work table having a planar working surface arranged to support a grid, a guide edge disposed along one side of said work table, said guide edge movably positionable relative to the working surface of said work table for providing a lateral support along one side of a grid positioned on the working surface, means for vertically positioning said guide edge, means for horizontally positioning said guide edge, said means for vertically positioning said guide edge comprises a support frame vertically displaceably mounted on said work table, means for moving said support frame in the vertical direction, said means for moving said support frame vertically comprises rollers dependently supported on the lower surface of said support frame, support surfaces in contact with said rollers on said support frame, said support surfaces disposed at an oblique angle to the longitudinal axis of said support frame, a movable member supporting said obliquely disposed support surfaces for selectively positioning said support surfaces and thereby vertically positioning said guide edge, pressure applying means facing the working surface of said table and movably positionable relative thereto for securing grids in a planar position on the work surface, and a welding device facing toward said working surface and movably positionable therealong for selectively welding side framing members to adjoining individual ones of the grid members.

2. A device for welding as set forth in claim 1, wherein said movable member comprises a rod having the obliquely disposed support surfaces mounted on the upper surface thereof, a pair of spaced roller elements mounted on said work table and supporting the lower surface of said rod, and means secured to said work table and to said movable rod for movably positioning said rod and thereby positioning the obliquely disposed surfaces relative to said rollers for positioning said guide edge in the vertical direction.

3. A device for welding as set forth in claim 2, wherein a stop member is mounted on said work table opposite the end of said movable rod for limiting the movement of said rod and determining the extent of the movement in the vertical direction of said guide edge.

4. A device for welding side framing members along the sides of a grid formed of main grid members and cross grid members comprising a frame construction forming a work table having a planar working surface arranged to support a grid, a guide edge disposed along one side of said work table, said guide edge movably positionably relative to the working surface of said work table for providing a lateral support along one side of a grid positioned on the working surface, strip members secured to said working table in the plane of said working surface and extending from said working surface in the location of said guide edge, said strip members disposed in space positions along the edge of the working surface adjacent said guide means for forming open spaces therebetween, the upper surface of said strip member has a downwardly sloping orientation whereby any materials collecting on the surface are shed therefrom, cam members mounted on said work table in the open spaces between said strip members and positioned along the edge of said working surface adjacent said guide edge, said cam members each having an operative position with the upper end of the cam member disposed above the working surface of said table and an inoperative position with the upper surface of said cam member disposed below said working surface so that in moving said cam members from the operative position to the inoperative position any adherent material deposited during welding can be displaced downwardly, pressure applying means facing the working surface of said table and movably positionable relative thereto for securing grids in a planar position on the work surface, and a welding device facing toward said working surface and movably positionable therealong for selectively welding side framing members to adjoining individual ones of the grid members.

5. A device for welding as set forth in claim 4, wherein said cam members comprise a first element and a second element, said first element arranged to extend upwardly above said support surface when said cam is in said operative position, said second element secured to the lower end of said first element and extending downwardly therefrom, and means secured to the lower end of said second element for moving said cam member between its operative and its inoperative positions.

6. A device for welding as set forth in claim 5, wherein a slide member is positioned in a slot in said work table adjacent the lower ends of said second elements of said cam members, means for securing the lower ends of the second elements of said cam members to said slide, and means for movably positioning said slide within the slot in said work table for moving said cam member between its operative and inoperative positions.

7. A device for welding as set forth in claim 6, wherein said means for moving said slide in the slot in said work table comprises a hydraulic cylinder having a movable arm, a bracket member securing said movable arm to said slide, whereby as said piston arm is extended and retracted within said hydraulic cylinder, said slide is movably positionable within the slot in said working table.

References Cited

UNITED STATES PATENTS

| | | | |
|---|---|---|---|
| 1,831,343 | 11/1931 | Caldwell | 219—124 |
| 2,473,858 | 6/1949 | Butler | 219—56 |
| 2,524,168 | 10/1950 | Harnish et al. | 269—297 |
| 2,955,192 | 10/1960 | Cohen | 219—58 |
| 3,019,328 | 1/1962 | Brasher et al. | 219—125 |
| 3,085,148 | 4/1963 | McConnell | 219—139 |
| 3,159,129 | 12/1964 | Lindmark | 228—44 |
| 3,171,375 | 3/1965 | Linnander | 113—131 |
| 3,401,254 | 9/1968 | McConnell | 219—125 |

ANTHONY BARTIS, Primary Examiner

L. A. SCHUTZMAN, Assistant Examiner

U.S. Cl. X.R.

29—203; 219—161; 228—49